(No Model.)

J. GILLET.
PROCESS OF MAKING SHEET METAL VESSELS.

No. 539,051. Patented May 14, 1895.

Witnesses:
Geo. W. Young.
Chas. L. Goss.

Inventor:
Joseph Gillet,
By Winkler, Londen, Smith, Potter & Coe
Attorneys.

UNITED STATES PATENT OFFICE.

JOSEPH GILLET, OF MILWAUKEE, WISCONSIN, ASSIGNOR TO THE GEUDER & PAESCHKE MANUFACTURING COMPANY, OF SAME PLACE.

PROCESS OF MAKING SHEET-METAL VESSELS.

SPECIFICATION forming part of Letters Patent No. 539,051, dated May 14, 1895.

Application filed September 1, 1892. Serial No. 444,778. (No specimens.)

*To all whom it may concern:*

Be it known that I, JOSEPH GILLET, of Milwaukee, in the county of Milwaukee and State of Wisconsin, have invented certain new and useful Improvements in Making Sheet-Metal Vessels; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

My invention relates to the manufacture of coal hods and other sheet metal vessels. Its main objects are to facilitate assembling and joining the parts, to insure a perfect joint between the body and base, and to simplify and cheapen the manufacture of articles of this class.

It consists essentially of the peculiar method of assembling and forming the joint between the body and base and of finishing the base, hereinafter particularly described and pointed out in the claims.

In the accompanying drawings like letters designate the same parts in the several figures.

Figure 1:
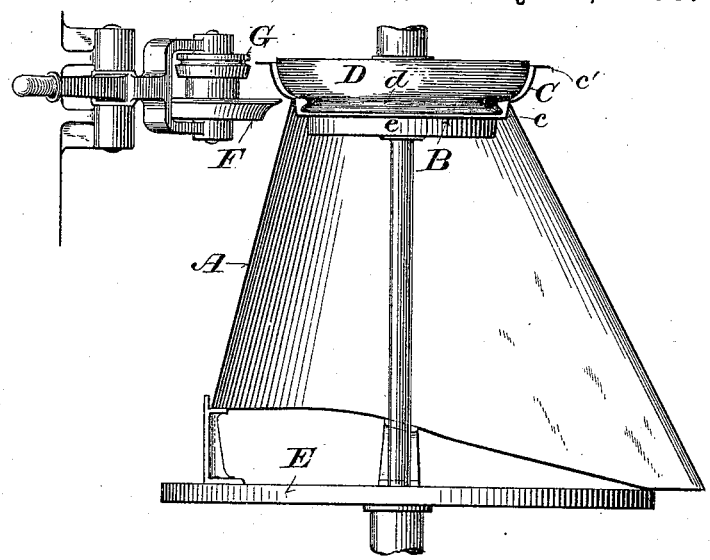
Figure 2:
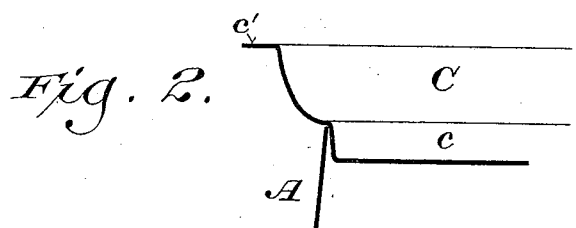
Figure 3:
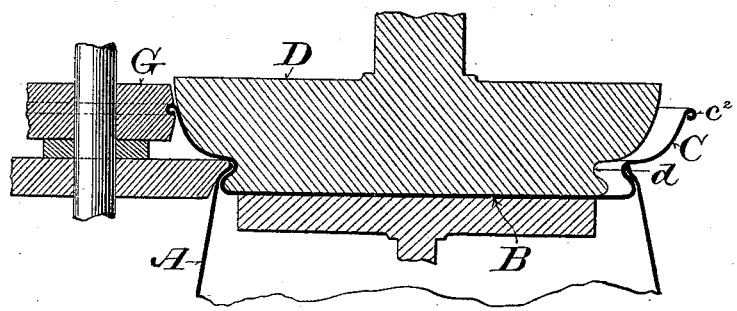
Figure 4:
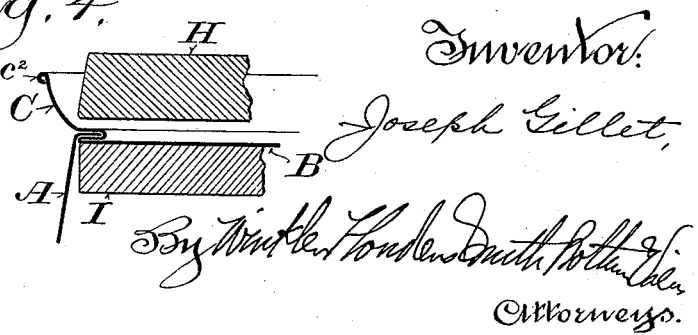

Figure 1 is a vertical axial section of the assembled parts of a coal-hod and a side elevation of a portion of suitable devices for holding them in position to be operated upon and for simultaneously bending the body into the base and turning a bead on the base; and Figs. 2 to 4, inclusive, are sectional views, on an enlarged scale, illustrating the several steps of the process, portions of the supporting device and grooving and beading wheels being shown in section in Fig. 3 and portions of the compressing-dies being shown in section in Fig. 4.

Referring to the drawings, A represents the body of a hod or other sheet metal vessel; B, the bottom, preferably formed integrally with a molded rim or base C, having an approximately vertical or cylindrical belt or band $c$ next to the bottom, and an outwardly projecting horizontal flange $c'$ at its outer edge.

By the process heretofore commonly followed of assembling and joining the body, bottom and base of similarly constructed vessels, an annular crease or groove has been formed in the base, the bottom edge of the body has been turned inwardly by a separate operation, and then sprung over the bottom into the groove or crease previously formed in the base, and by a final operation the base has been upset to clasp the inturned edge of the body, as shown in Fig. 4. The bead $c^2$ around the edge of the base has also been formed heretofore by a distinct operation. By this method of assembling, joining and finishing the parts, a number of separate operations, involving considerable time and labor are not only necessary, but if the inturned flange on the body is made to fit closely in passing over the bottom into the groove formed for its reception in the base, great trouble and annoyance are occasioned in assembling the parts, and if it is not made to fit closely, imperfect joints are produced, portions of the edge of the inturned flange of the body not being clasped between the folds formed by upsetting the base upon it.

By my improved process a number of operations are not only dispensed with, but the annoyance of assembling the parts is avoided, and a perfect joint insured. The bottom B formed with the base C as above mentioned, is placed in the body, as shown in Figs. 1 and 2, with the edge of the body resting in the angle between the belt $c$ and the outwardly turned portion of the base C. The hod or vessel is then placed preferably bottom side up on a suitable rotary table or support E, with the bottom resting on a support $e$, carried by the support E, and is moved upwardly against a die D, which fits loosely into the recessed side of the base. The die D and support E being rotated, a wheel F or other creasing or grooving instrument, is forced against the outside of the edge of the body A and belt $c$ of the base opposite an annular groove $d$ in die D, thereby simultaneously forming an inturned crease or groove in the base, and turning the edge of the body into said groove or crease, as shown in Fig. 3. The body is thus permanently and securely joined to the base in the proper position for the final operation, which consists of upsetting and folding the base over the inturned edge of the body, as shown in Fig. 4, by dies such as H and I, or by other suitable means. In this way the enfolding of the inturned edge of the body by upsetting the base on opposite sides of the groove previously formed therein, and a permanent tight joint extending entirely around the vessel are insured. Simultaneously with the formation of the groove or crease in the base and the inturning of the edge of the body therein, the flange $c'$ on the edge of the base is rolled into a bead $c^2$ by a bead-turning wheel such as G, on the same shaft with the groove-forming wheel F, or by any other suitable means or instrument. It will thus be observed by the process as above described, I am enabled to dispense with two operations in assembling and joining the body and base and in finishing the edge of the base, viz: by the separate formation of the inturned flange on the body and the bead around the edge of the base, much annoyance and waste of time are avoided in assembling the parts and a better joint insured.

The lower part of die D is made enough smaller in diameter than the bottom and base to permit of its being withdrawn therefrom after the body and base have been turned into the groove $d$ by the wheel F, as shown in Fig. 3.

Some of the advantages hereinbefore mentioned, viz: saving of time in assembling the parts and insuring a perfectly tight joint, will be secured when the bottom and base are made in separate parts, also when an inturned groove or crease is formed in the base before inserting it in the body; although I prefer to apply the invention in the manner hereinbefore set forth, dispensing with unnecessary operations and thereby saving time and labor.

The rotary support E and the grooving and beading rollers F and G are such as are commonly used in machines designed for the class of sheet metal work to which my invention relates, and as they do not in themselves constitute a part of my invention, it is not necessary to particularly show and describe them or their necessary attachments or connections, which are familiar to those skilled in this kind of work.

I claim—

1. The process of making sheet metal vessels which consists in forming the base primarily with an upwardly projecting approximately cylindrical belt and an outwardly projecting rim below said belt, inserting said belt into the lower open end of the body which is primarily formed without flange or bend, simultaneously forming a groove in the base and turning the overlying portion of the body into said groove and in then upsetting or compressing the base over and against the inturned portion of the body, substantially as and for the purposes set forth.

2. The process of making sheet metal vessels which consists in forming the base with an approximately vertical or cylindrical belt, placing the lower edge of the body around said belt, simultaneously forming an annular groove in said belt and turning the edge of the body into said groove and of then folding and compressing the base on opposite sides of said groove over the inturned edge of the body, substantially as and for the purposes set forth.

3. The process of making sheet metal vessels which consists in forming the base with an upwardly projecting belt and an outwardly turned flange below said belt, inserting said belt into the lower end of the body and then simultaneously forming an inturned groove in the base, turning the overlapping portion of the body into said groove and turning the flange at the edge of the base into a bead, substantially as and for the purposes set forth.

4. The process of joining the body and base of a sheet metal vessel which consists in forming the base with an upwardly projecting belt, inserting the upturned belt of the base into the lower open end of the body and then turning the overlapping portion of the body into the base and finally folding or compressing the groove thus formed in the base over the inturned portion of the body, substantially as and for the purposes set forth.

In testimony that I claim the foregoing as my own I affix my signature in presence of two witnesses.

JOSEPH GILLET.

Witnesses:
OTTO C. KNELL,
CHAS. L. GOSS.